(12) United States Patent
Lee et al.

(10) Patent No.: US 7,274,870 B2
(45) Date of Patent: Sep. 25, 2007

(54) APPARATUS AND METHOD FOR SIMULTANEOUS CHANNEL AND OPTICAL SIGNAL-TO-NOISE RATIO MONITORING

(75) Inventors: San-Liang Lee, Taipei (TW); Chun-Liang Yang, I-Lan Hsien (TW); Jui-Ting Wu, Taoyuan Hsien (TW); Ming-Hsiao Yang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 664 days.

(21) Appl. No.: 10/461,626

(22) Filed: Jun. 14, 2003

(65) Prior Publication Data

US 2004/0156632 A1 Aug. 12, 2004

Related U.S. Application Data

(60) Provisional application No. 60/447,133, filed on Feb. 12, 2003.

(51) Int. Cl.
*H04B 10/08* (2006.01)
(52) U.S. Cl. ....................................................... 398/26
(58) Field of Classification Search ............... 398/9–38
See application file for complete search history.

(56) References Cited

U.S. PATENT DOCUMENTS

| | | | | |
|---|---|---|---|---|
| 5,223,705 A | | 6/1993 | Aspell et al. ................ 250/225 |
| 5,659,412 A | * | 8/1997 | Hakki ........................ 398/152 |
| 6,347,169 B1 | | 2/2002 | Kang et al. .................. 385/24 |
| 6,396,051 B1 | | 5/2002 | Li et al. .................. 250/227.18 |
| 6,396,574 B1 | | 5/2002 | Lee et al. ................... 356/73.1 |
| 6,433,864 B1 | | 8/2002 | Chung et al. ............... 356/73.1 |
| 2002/0021861 A1 | * | 2/2002 | Gnauck et al. ............... 385/24 |
| 2002/0093993 A1 | * | 7/2002 | LaGasse et al. ............ 370/536 |
| 2003/0090768 A1 | * | 5/2003 | Liu et al. ..................... 359/183 |
| 2004/0126108 A1 | * | 7/2004 | Chung et al. ................. 398/26 |

OTHER PUBLICATIONS

I. M. Rasztovits-Wiech et al., "Optical signal-to-noise ratio measurement in WDM networks using polarization extinction," in ECOC '98, Sep. 1998, pp. 549-550.

J. H. lee et al., "OSNR Monitoring technique Using Polarization-Nulling Method," IEEE Photonics Technology Letters, vol. 13, No. 1, pp. 88-90, Jan. 2001.

* cited by examiner

*Primary Examiner*—Jason Chan

(57) ABSTRACT

An apparatus and method for simultaneous channel and optical signal-to-noise ratio (OSNR) monitoring is adapted to function in multi-channel wavelength-division-multiplexed (WDM) optical communication systems. A polarization controller is sequentially adjusted to perform the sequential polarization control with an optical signal. A polarization-selective electro-optic modulator acts as a polarizer and provides a signal dithering to improve the detection sensitivity. A beam splitter splits the dithered optical signal into two clusters. A photodetector receives the first cluster and measures the OSNR. An optical element receives the second cluster and monitors the channel wavelength of multiple channels. The apparatus can be packaged into a compact module and integrated on a chip. The channel monitoring covers a wide wavelength range and is tunable. The OSNR monitoring can be accurate over a wide dynamic range.

12 Claims, 8 Drawing Sheets

APPARATUS AND METHOD FOR SIMULTANEOUS CHANNEL AND OPTICAL SIGNAL-TO-NOISE RATIO MONITORING

CROSS-REFERENCES TO RELATED APPLICATIONS

This is a non-provisional application of U.S. Provisional Application No. 60/447,133, filed on Feb. 12, 2003, which is incorporated herewith by reference.

FIELD OF THE INVENTION

The present invention generally relates to an apparatus and method for simultaneous channel and optical signal-to-noise ratio (OSNR) monitoring used in dense wavelength-division-multiplexing (DWDM) optical transmission systems.

BACKGROUND OF THE INVENTION

Optical performance monitoring of power, wavelength, and optical signal-to-noise ratio is required in wavelength-division-multiplexed (WDM) networks for providing quality of service and assuring network survivability. While amplified spontaneous emission (ASE) is unpolarized, the data signal remains almost polarized during transmission. Hence polarization extinction (PE) has been employed to determine the OSNR after measuring the ASE level. In the approach based on the polarization extinction, monitoring of the OSNR was demonstrated by measuring the polarization extinction ratio of WDM signals.

FIG. 1 shows two proper measurement setups based on the polarization extinction. They utilize a polarization controller 101 including a polarizer in front of either a conventional optical spectrum analyzer (OSA) 103 or a tunable optical filter 105 followed by a power meter 107. First the state of polarization of the incoming WDM signal is changed by means of the polarization controller 101 until the optical spectrum analyzer 103 or the power meter 107 indicates minimum power in the channel under investigation. For ASE, the reading will show half the ASE power. Then the polarization controller 101 is set to the orthogonal state. The displayed power is a maximum and corresponds, in case of sufficiently high OSNR, to the signal power. With these values, the OSNR is calculated.

The significant feature of the above PE technique is that this approach requires only a low-cost optical spectrum analyzer. However, a minute change in outside temperature could affect the polarization state of DWDM signals in transmission fiber. Thus, for the use in a practical network, it is necessary to adjust the polarization state of each channel. A simple technique that can be used to monitor the OSNR automatically is using the polarization-nulling method. This technique, based on the polarization-nulling method, was implemented by using a rotating quarter-wave plate and a rotating linear polarizer.

FIG. 2 shows the experimental setup to demonstrate the operating principle of the polarization-nulling technique. In the experimental setup, it uses a tunable laser 201 and an ASE source 203 to simulate an optical signal with various OSNR. Thus, the OSNR could be changed easily by adjusting the variable attenuators placed in front of these optical sources The optical signal was filtered by 1*8 waveguide grating router (WGR) 205, and then sent to the OSNR monitoring module 207 via an optical attenuator. The state of polarization of the optical signal incident on the OSNR monitoring module could be linear, circular, or elliptical. However, this arbitrarily polarized signal could be changed to a linearly polarized signal simply by using a rotating quarter-wave plate. The linear polarizer, placed at the output of the quarter-wave plate, was also rotated slowly.

Thus, the signal power (together with the polarized ASE noise) was measured whenever the linearly polarized signal from the rotating quarter-wave plate was aligned to the rotating linear polarizer. The polarized ASE could be measured when the linear polarizer was in the orthogonal state with the linearly polarized signal obtained by the rotating quarter-wave plate. The OSNR therefore could be monitored by comparing the maximum and minimum values of the detected signals.

U.S. Pat. No. 5,223,705 discloses a measurement of an optical amplifier parameter with polarization by using a polarization controller and a linear polarizer for measuring the ASE noise and gain of an optical amplifier. By sequentially adjusting the polarization controller, sequential measurement from the linear polarizer can have the sequential output of minimum and maximum optical powers. The minimum optical power represents the half ASE value, while the maximum optical power represents sum of the half ASE and optical signal values. Therefore, this approach can measure the ASE noise and gain of an optical amplifier.

The above mentioned techniques utilize a combination of a polarization rotator and a linear polarizer to measure the OSNR. The measurement is based on the assumption that the signal is polarized while the noise is not. To improve the sensitivity of monitoring and enable multi-parameter monitoring, a compact module for simultaneous channel and OSNR monitoring is provided in the present invention.

SUMMARY OF THE INVENTION

The present invention has been made to overcome the above-mentioned drawback of conventional optical signal-to-noise ratio monitoring. The primary object of the present invention is to provide an apparatus and method for simultaneous channel and OSNR monitoring. Accordingly, the apparatus of the invention comprises a polarization controller, a dithering signal, an electro-optic (E-O) modulator, a beam splitter, a photodetector and an optical element.

The OSNR is performed with the combination of the polarization controller and the E-O modulator. The E-O modulator also applies the dithering signal to a selected channel to improve the detected quality for both the photodetector and optical element. The OSNR and channel number are measured with the photodetector and the optical element. The E-O modulator is very polarization-selective to enable the needed function. In other words, it allows one of the two othogonal polarizations to pass through, and acts as a substantially linear polarizer. The optical element monitors multiple channels and its monitoring wavelength window can be easily tuned to cover different wavelength bands by adjusting its bias current.

The channel monitoring according to the invention covers a wide wavelength range, and the OSNR monitoring is accurate over a wide dynamic range. The apparatus can also be packaged into a compact module and integrated on a chip.

In a preferred embodiment, the apparatus of the invention uses a light-emitting diode (LED) sensor as the optical element for recognizing the channel wavelength from the induced junction voltage across the LED diode. The LED sensor provides many advantages over the channel monitoring approaches, including the use of an optical filter, double detectors, and interferometers, etc. It is also superior to the semiconductor optical amplifier (SOA) or Fabry-Perot laser diode (FPLD) sensor that exploits the same detection principle as a LED. A LED sensor is very low-cost and monitors a wide range of wavelengths at a given bias. The monitoring wavelength window can be easily adjusted to achieve the best performance by changing its bias current.

The present invention demonstrates the method for simultaneous channel and OSNR monitoring by comprising the steps of the operating principle for the apparatus. A portion of power is first tapped out from a selected channel and fed into the polarization controller then the E-O modulator. The sequential polarization control is performed with the optical signal fed into the polarization controller by sequentially adjusting the polarization controller. A dithering signal of the E-O modulator is provided to improve the detection sensitivity. The beam splitter then splits the dithered optical signal into two clusters. One is provided for the photodetector to measure the OSNR value. The other is provided for the optical element to monitor the optical channel.

In the invention, the optical channel recognition and wavelength drift are demonstrated with the experimental results of eight DWDM channels of 100 GHz spacing. The invention also shows the measured optical spectra at the output of the E-O modulator, and the outputs for two orthogonal polarization states are compared. Experimental results indicate that the polarization extinction ratio is 37.9 dB and 36.7 dB for a single 2.5 Gbps and 10 Gbps channel, respectively. The OSNR value can be calculated from the detected maximal and minimal voltages by adjusting the polarization controller. The invention also demonstrates the measured OSNR is very consistent with the data measured by the OSA, and it can measure the OSNR up to 31 dB while the error is kept within 0.5 dB.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
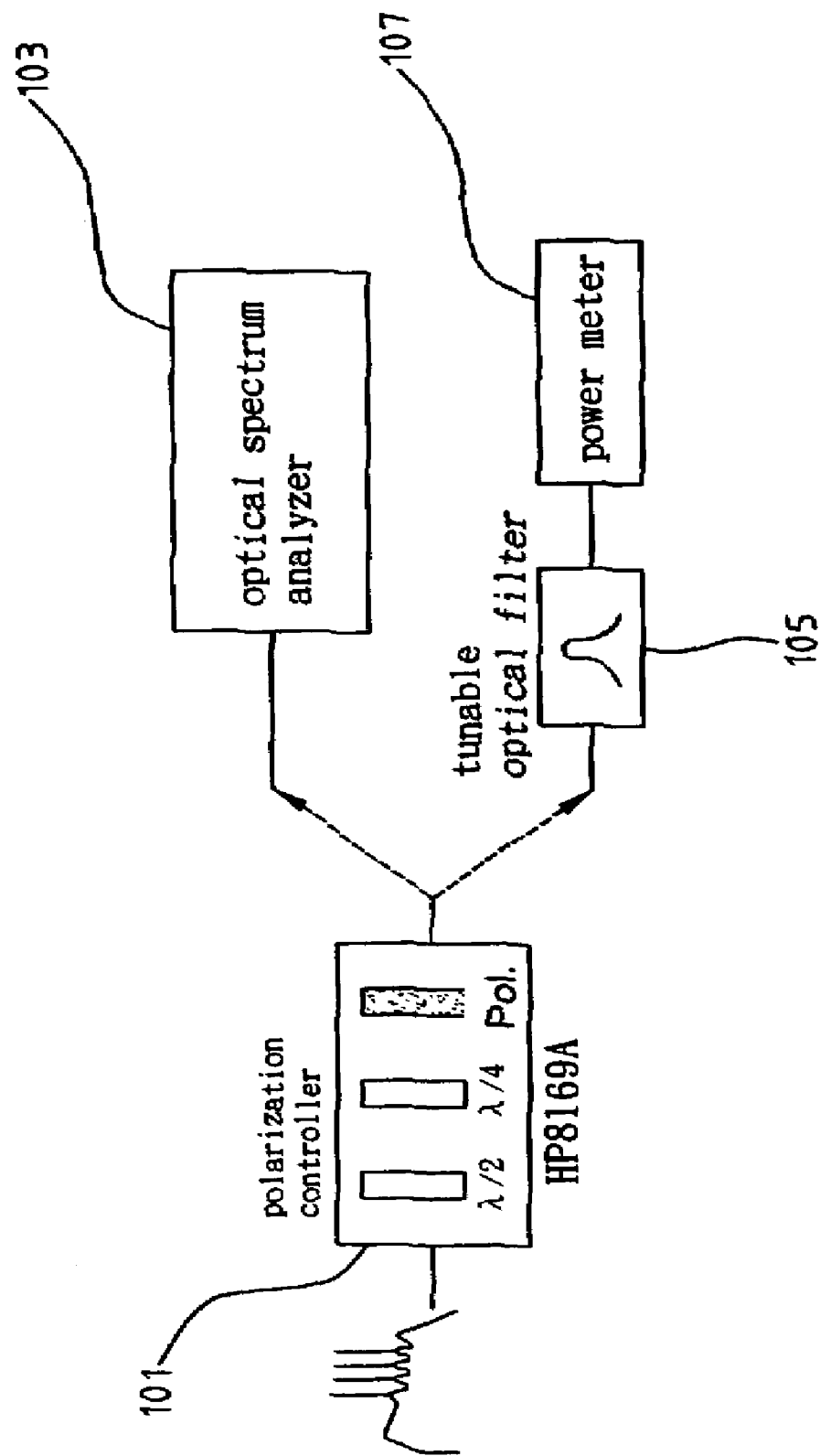
FIG. 1 shows a conventional OSNR measurement configuration based on the polarization extinction.
Figure 2:
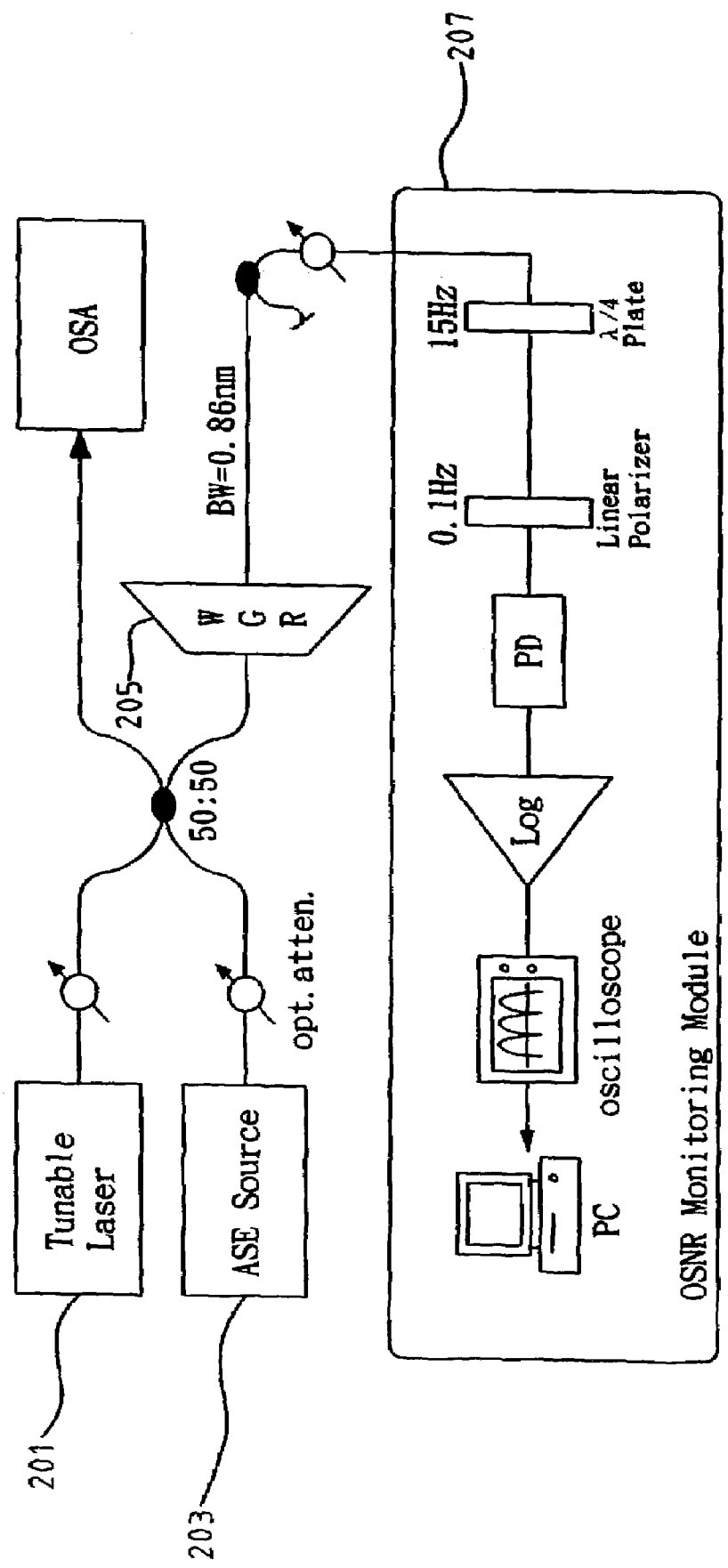
FIG. 2 shows a schematic diagram of a conventional OSNR monitoring technique using the polarization-nulling method.
Figure 3:
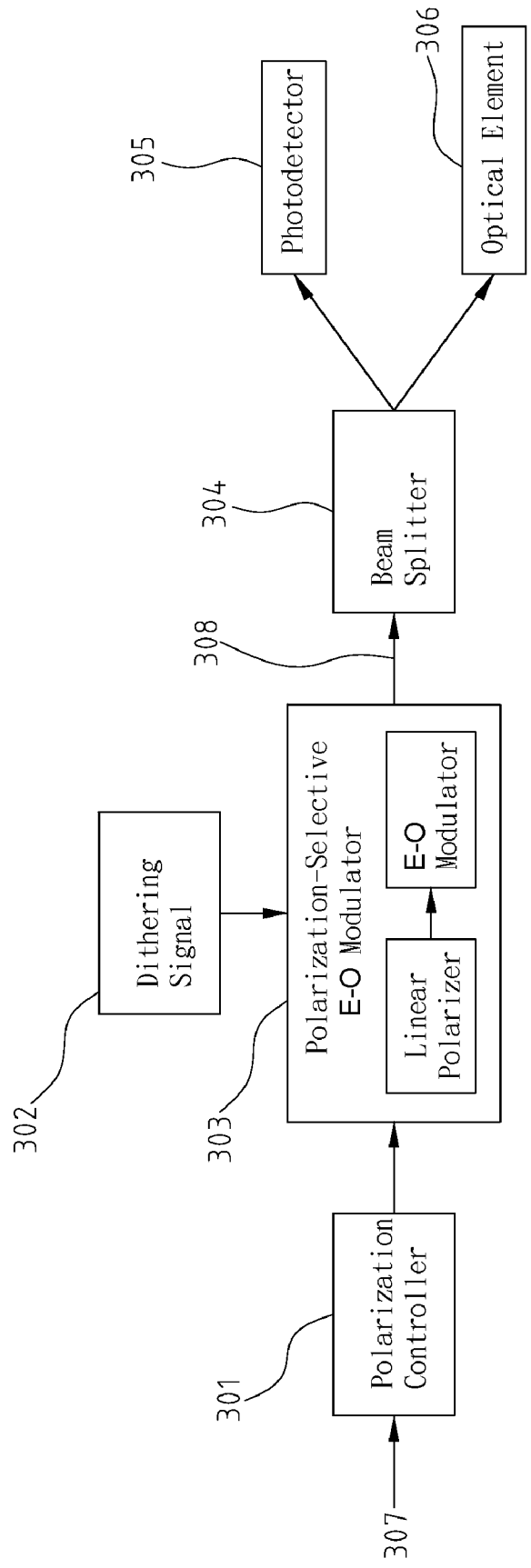
FIG. 3 shows a block diagram of the apparatus for OSNR monitoring and channel recognition of the invention.

The gist of the present invention is using a polarization-selective electro-optic modulator and an optical channel recognizing unit for OSNR monitoring and channel recognition in DWDM networks. FIG. 3 shows a block diagram of the apparatus for OSNR monitoring and channel recognition of this invention. The apparatus comprises a polarization controller 301, a dithering signal 302, a polarization-selective E-O modulator 303, a beam splitter 304, a photodetector 305 and an optical element 306. The polarization controller 301, the E-O modulator 303, the beam splitter 304 and the photodetector 305 are configured as an OSNR measurement unit. The beam splitter 304 and the optical element 306 are configured as an optical channel recognizing unit. The dithering signal 302 is provided and fed into the E-O modulator 303 and then applied to a selected channel in order to improve the detection sensitivity and dynamic range for both the photodetector 305 and optical element 306. The optical element is used for recognizing the channel wavelength.

According to this invention, the optical element 306 may be a LED sensor, SOA or optical filter plus photodiode. The polarization-selective E-O modulator may be a linear polarizer in serial with an E-O modulator or an E-O modulator with a structure that one of the polarizations is lost as it propagates in the modulator It is also notable that all the elements in the apparatus of the invention can be packaged into a compact module and integrated on a chip.

Referring to FIG. 3, the optical signal 307 is first tapped out from a selected channel and is fed into the polarization controller 301 then the E-O modulator 303. The sequentially adjusting the polarization controller 301 is performed with the optical signal 307 fed into the polarization controller 301. A dithering signal 302 of the E-O modulator 303 is provided to improve the detection sensitivity. The beam splitter 304 then splits the dithered optical signal 308, the output of the E-O modulator 303, into two clusters. One is applied to the photodetector 305 for measuring the OSNR value. The other is applied to the optical element 306 for recognizing the optical channel.

Figure 4:
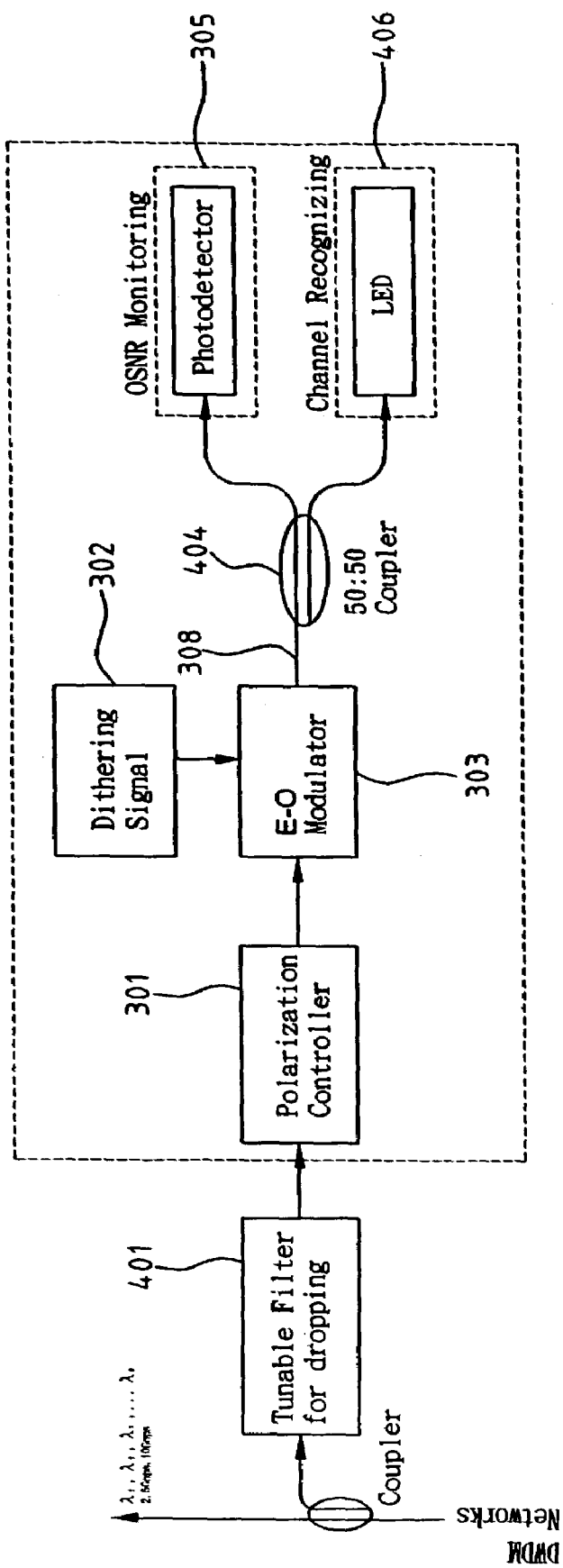
FIG. 4 shows an embodiment of FIG. 3 in which LED sensor is used as optical element.

FIG. 4 shows an embodiment of FIG. 3 in which a LED sensor is used as optical element and the dithered optical signal 308 is split into two clusters with a ratio of 50:50. As can be seen from the FIG. 4, the signal and noise are passed through a tunable optical filter 401 to simulate the channel selection or dropping function. The optical signal 307 is tapped out from the selected channel and is fed into the polarization controller 301. Sequentially adjusting the polarization controller 301 then is performed with the optical signal 307. To enable the needed function, the E-O modulator 303 is very polarization-selective, i.e., it allows one of the two othogonal polarizations to pass through, like a substantially linear polarizer.

With such an E-O modulator and the polarization controller, the channel OSNR can be measured in a similar way as the polarization nulling approach. On the same time, the E-O modulator applies the dithering signal 302 to the selected channel to improve the detection sensitivity and dynamic range for both the photodetector 305 and LED sensor 406. The dithered optical signal 308 is split into two clusters by a coupler 404 with a ratio of 50:50 in the embodiment. These two clusters are respectively provided for the photodetector 305 and the LED sensor 406. The OSNR and channel number are measured with the photodetector 305 and the LED 406 sensor, respectively.

The LED sensor 406 is used for recognizing the channel wavelength from the induced junction voltage across the LED diode. It is the same as the wavelength detection approach that utilizes the wavelength-dependent transparent properties in a FPLD or a SOA.

Like a laser diode or SOA, the LED has a gain material of which the transparent current decreases as the wavelength moves to the long-wavelength side. The junction voltage across the electrodes of the LED is almost linearly proportional to the difference between the transparent current and the bias current. It is clear that the induced voltage varies with the wavelength change and can be used for detecting the wavelength.

Figure 5:
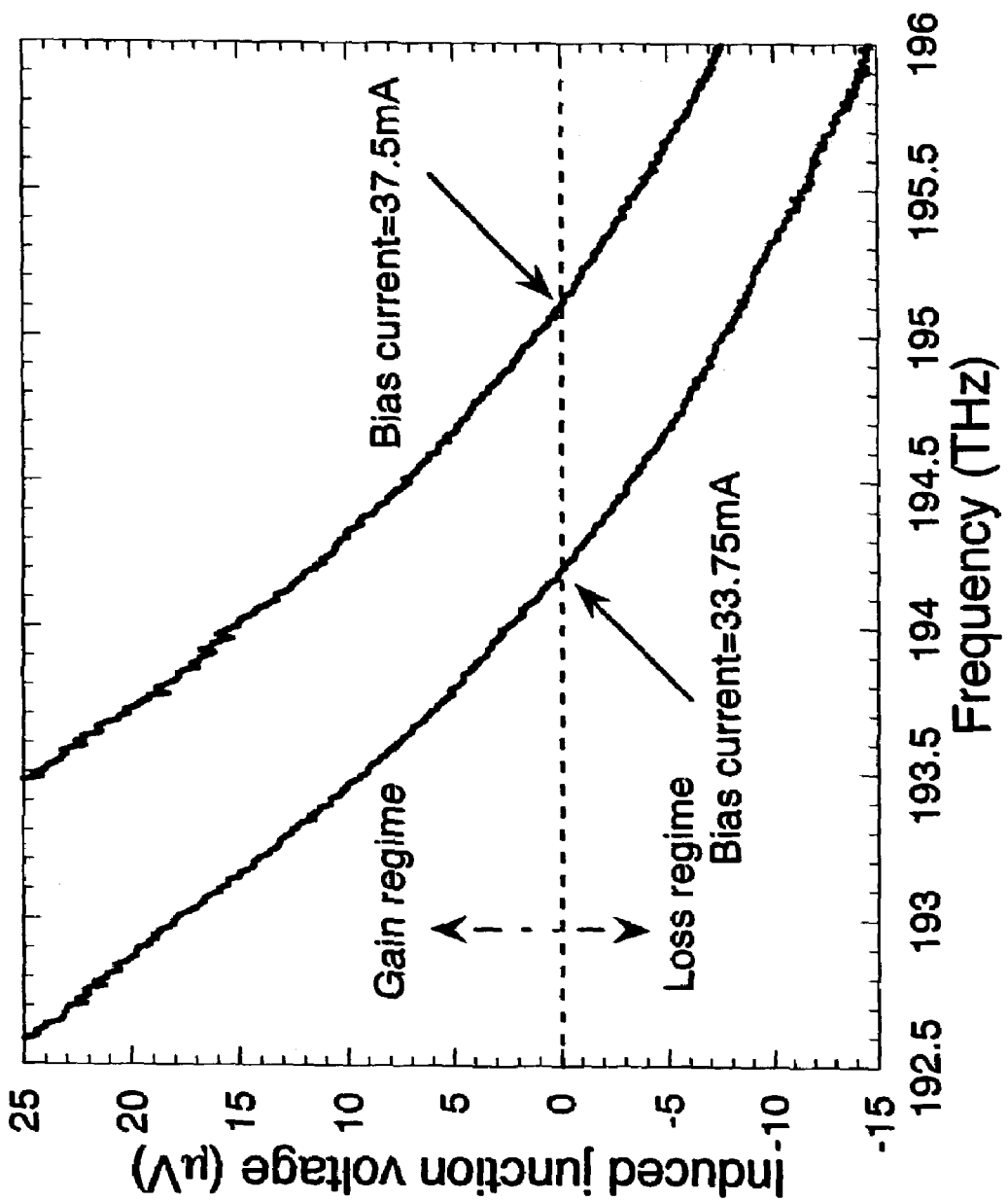
FIG. 5 shows the induced junction voltage of a LED for different channel monitoring sub-windows by changing bias current.

The LED sensor can monitor multiple channels and its monitoring wavelength window can be easily tuned to cover different wavelength bands by adjusting its bias current. For instance, the induced voltage of an edge-emitting LED (PD-LD model PLD E15-506) is shown in FIG. 5. The induced junction voltage in response to a dithered input light can be detected with a narrow electric bandpass filter to eliminate the noise associated with the detection process. The output signal is very sensitive to a wavelength change. The output voltage shown in FIG. 5 was measured with using a phase sensitive detection (PSD) circuit, so the negative magnitude of induced voltage is displayed at the loss regime. When a PSD circuit, e.g., a lock-in amplifier, is used to sense the voltage, a monotonic relationship between the detected voltage and the input wavelength can be obtained. This invention allows a larger range of wavelengths to be detected by a LED.

The LED sensor can provide many advantages over the previously demonstrated channel monitoring approaches, including the use of an optical filter, double detectors, and interferometers, etc. It is also superior to the SOA or FPLD sensor that exploits the same detection principle as a LED. The LED sensor is very low-cost and can monitor a wide range of wavelengths at a given bias current. The monitoring wavelength window can be easily adjusted to achieve the best performance by changing its bias current.

Though a low cost FPLD was demonstrated to monitoring DWDM channels with satisfactory performance, it is subject to the voltage resonance induced from the facet reflection, which requires choosing an appropriate LD length and careful adjustment of the bias current. The only concern for using a LED sensor is that it may require temperature control. Since the LED needs to simply distinguish the channels from each other rather than to accurately detect the channel wavelength, the detection window is relatively large, so it does not need tight temperature control in the invention.

According to this invention, the maximal voltage measured by the photodiode indicates the signal power plus the half noise power, while the minimal voltage corresponds to half of the noise power if the signal is completely suppressed by the polarized modulator. Thus, the OSNR monitoring is performed with the combination of the polarization controller 301 and the substantially linear polarized E-O modulator 303. The E-O modulator 303 also applied a single-tone sinusoidal signal to the input signal and noise to improve the detected quality for both monitoring paths. The frequency of the dithering signal 302 is 10 kHz in the experiments The channel wavelength is then detected by the LED sensor 406 which is followed by a narrow bandpass filter to reject the detection noise.

Figure 6:
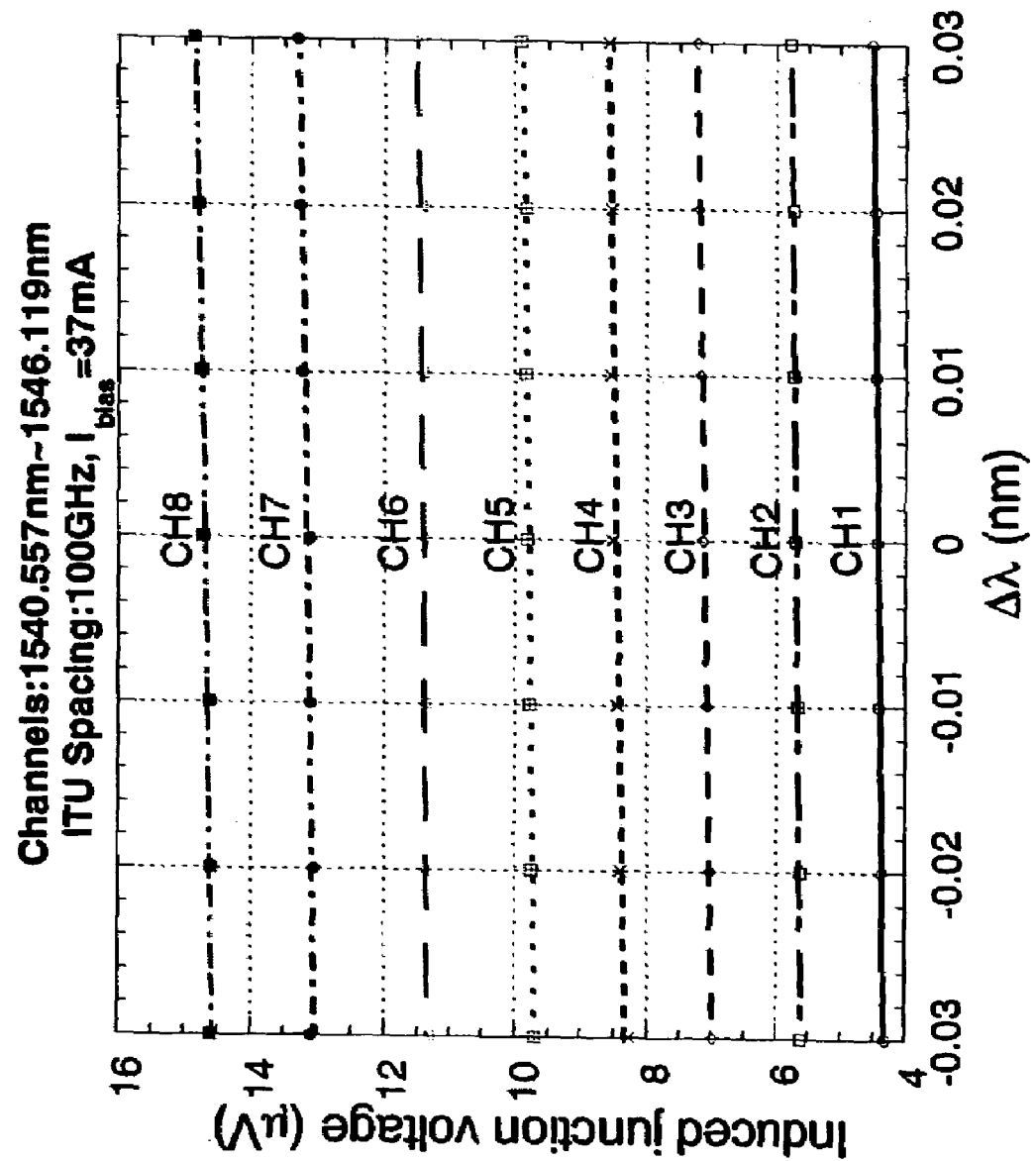
FIG. 6 shows the induced junction voltage of a LED versus wavelength drift for eight DWDM channels of 100 GHz spacing.

FIG. 6 shows the induced junction voltage of a LED versus wavelength drift for eight DWDM channels, CH1~CH8, of 100 GHz spacing. FIG. 6 also shows the variation of the voltage with the wavelength drift. Typically, the wavelength locker can assure the wavelength drift of a DWDM channel to be within +/−0.02 nm. For such an amount of possible wavelength drift, the induced voltage between the adjacent channels can be clearly distinguished. Moreover, due to the large separation in the detected voltage for different channels, the tolerance on temperature control of the sensor can be relaxed to 0.24° C. The reliability and stability of this type of channel monitoring technique have been verified for the FPLD sensor.

Figure 7:
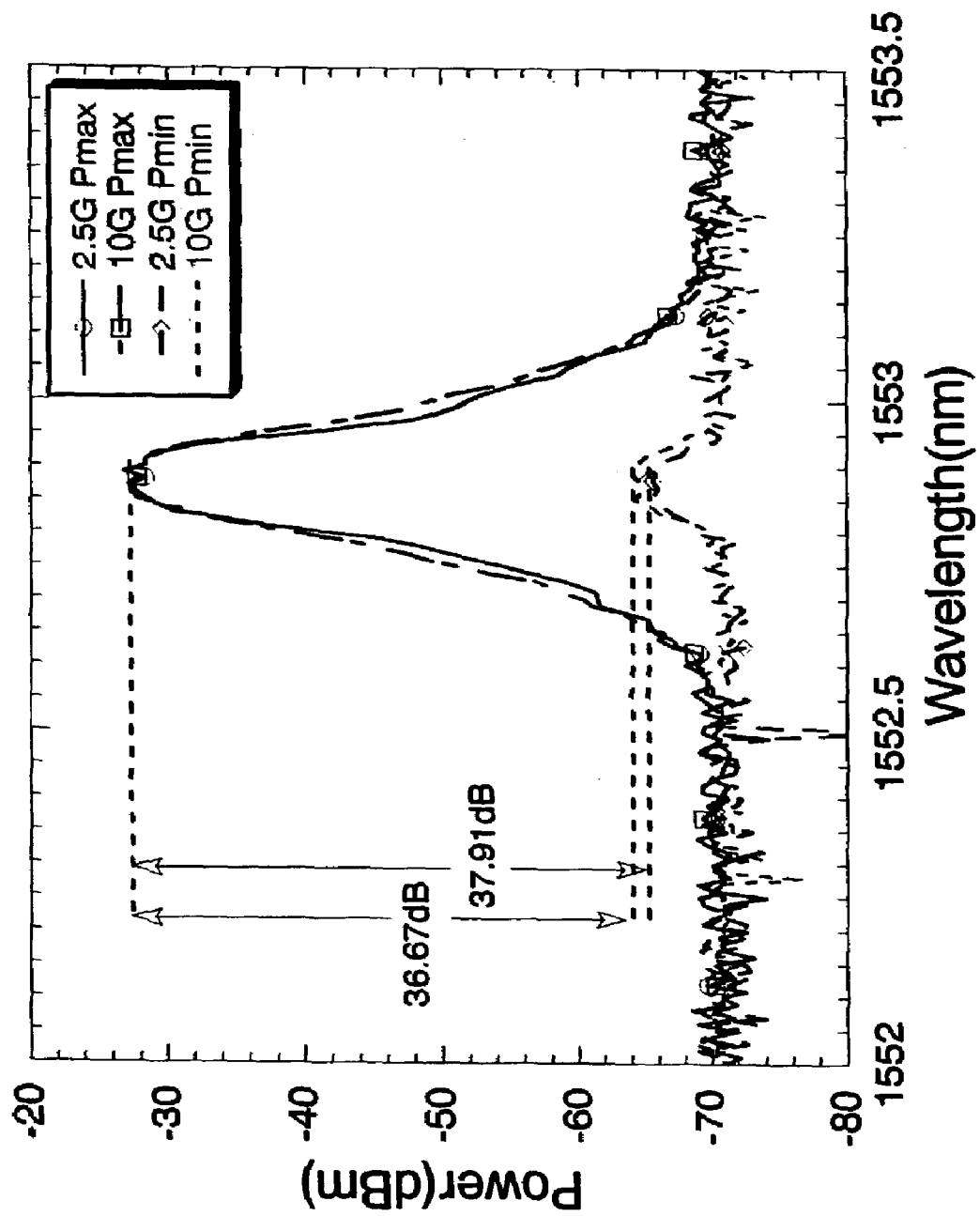
FIG. 7 shows the measured optical spectra at the output of the E-O modulator for two orthogonal polarization states.

The following further describes the operating principle of the invention for simultaneous channel and OSNR monitoring. The sequentially adjusting the polarization controller 301 is performed with the optical signal 307 fed into the polarization controller 301. Then the polarization controller 301 switches the polarization states to where the maximal or minimal value occurs at the output of the E-O modulator 303. By such sequentially adjusting the polarization controller, the photodetector 305 can detect the measured minimum optic power $P_{min}$ and maximum optic power $P_{max}$. FIG. 7 shows the measured optical spectra at the output of the E-O modulator for two orthogonal polarization states at the 2.5 Gbps and 10 Gbps bit rates, respectively. The outputs for two orthogonal polarization states are compared in the FIG. 7. The results indicate that the polarization extinction ratio is 37.9 dB and 36.7 dB for a single 2.5 Gbps and 10 Gbps channel, respectively.

Figure 8:
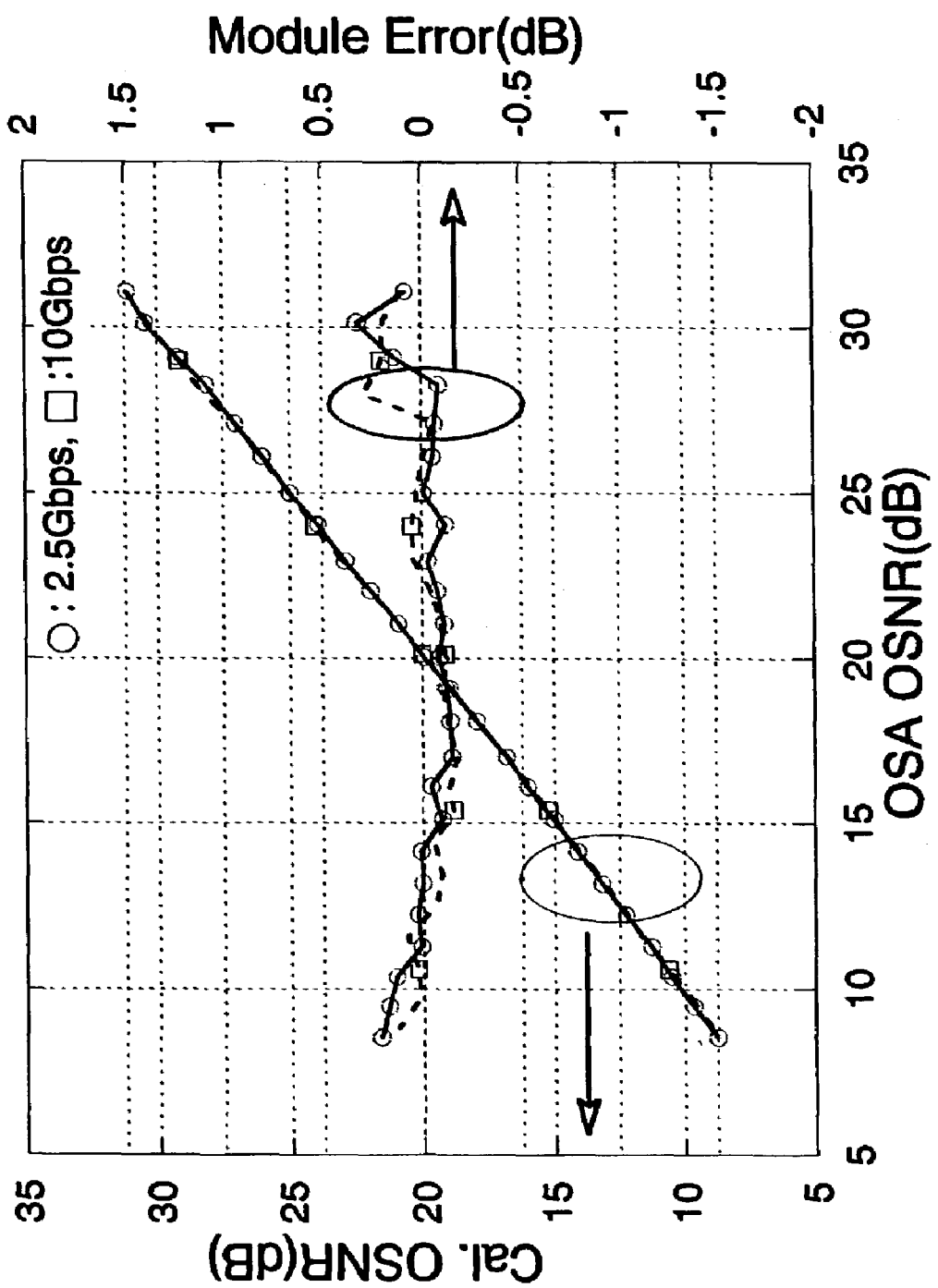
FIG. 8 compares the OSNR measured by the apparatus of the present invention and a high-performance optical spectrum analyzer for the bit rate of 2.5 Gbps and 10 Gbps, respectively.

The OSNR value can be calculated from the detected maximal and minimal voltages by switching the two orthogonal polarization states. FIG. 8 compares the OSNR measured by the apparatus of the present invention and a high-performance optical spectrum analyzer for the bit rate of 2.5 Gbps and 10 Gbps, respectively. The calibrated OSNR refers to the measured value but corrects the factors that are different for the two measurement techniques. The factors include the 3 dB difference in the measured noise level since only half of the ASE noise is measured by the polarized modulator. They also include the difference (4.2 dB) in the filter bandwidth between the tunable optical filter and the monochrometer in the OSA. The results indicate that the measured OSNR is very consistent with the data measured by the OSk Our module can measure the OSNR up to 31 dB while the error is kept within 0.5 dB.

From the above, the key components of the present invention are the E-O modulator and LED sensor for OSNR monitoring and channel recognition. In an experiment, this invention chooses a packaged Mach-Zehnder amplitude modulator made by the AT&T (model M2122AA). The E-O modulator is pigtailed with standard single-mode fiber (SMF) on both ends. It is very polarization-selective and has a polarization extinction ratio larger than 30 dB. The LED sensor is a 1.55 μm edge-emitting LED.

Generally speaking, the apparatus and method for simultaneous channel and OSNR monitoring by using a polarization-selective E-O modulator and a low-cost optical element have demonstrated the following advantages: (1) low cost; (2) compact; it can be packaged into a compact module and integrated on a chip; (3) the channel monitoring can cover a wide wavelength range and is tunable; and (4) the OSNR monitoring can be accurate over a wide dynamic range.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for simultaneous channel and optical signal-to-noise ratio monitoring, comprising:
   a polarization controller being sequentially adjusted to perform polarization control of an optical signal;
   a dithering signal;
   a polarization-selective electro-optic modulator receiving said optical signal from said polarization controller and applying said dithering signal to a selective channel, then outputting a dithered optical signal having a single polarization;
   a beam splitter splitting said dithered optical signal into first and second clusters;
   a photodetector receiving said first cluster and measuring said optical signal-to-noise ratio; and
   an optical element receiving said second cluster and monitoring channel wavelength of said dithered optical signal;
   wherein said polarization controller is sequentially adjusted to switch polarization state of said optical signal for generating a maximal or minimal value at the output of said polarization-selective electro-optic modulator to measure said optical signal-to-noise ratio.

2. The apparatus for simultaneous channel and optical signal-to-noise ratio monitoring as claimed in claim 1, wherein said polarization controller, said polarization-selective electro-optic modulator, said beam splitter and said photodetector are configured as an optical signal-to-noise ratio measurement unit.

3. The apparatus for simultaneous channel and optical signal-to-noise ratio monitoring as claimed in claim 1, wherein said beam splitter and said optical element are configured as an optical channel recognizing unit.

4. The apparatus for simultaneous channel and optical signal-to-noise ratio monitoring as claimed in claim 1, wherein said optical element is a light-emitting diode serving as a wavelength sensor.

5. The apparatus for simultaneous channel and optical signal-to-noise ratio monitoring as claimed in claim 1, wherein said dithered optical signal is split into two clusters by a coupler with a ratio of 50:50.

6. The apparatus for simultaneous channel and optical signal-to-noise ratio monitoring as claimed in claim 1, wherein said polarization-selective electro-optic modulator selects a substantially linearly polarized optical signal for electro-optic modulation.

7. The apparatus for simultaneous channel and optical signal-to-noise ratio monitoring as claimed in claim 1, wherein said polarization-selective electro-optic modulator is a linear polarizer in serial with an electro-optic modulator.

8. The apparatus for simultaneous channel and optical signal-to-noise ratio monitoring as claimed in claim 1, wherein said apparatus is packaged into a compact module and integrated on a chip.

9. The apparatus for simultaneous channel and optical signal-to-noise ratio monitoring as claimed in claim 1, wherein said polarization-selective electro-optic modulator is an E-O modulator with a structure in which one polarization is lost after propagating through said polarization-selective electro-optic modulator.

10. The apparatus for simultaneous channel and optical signal-to-noise ratio monitoring as claimed in claim 1, wherein said optical element is a semiconductor optical amplifier serving as a wavelength sensor.

11. The apparatus for simultaneous channel and optical signal-to-noise ratio monitoring as claimed in claim 1, wherein said optical element is an optical filter serving as a wavelength sensor.

12. A method for simultaneous channel and optical signal-to-noise ratio monitoring, comprising the steps of:
   (a) providing an optical signal for a polarization controller;
   (b) sequentially adjusting said polarization controller to perform sequential polarization control of said optical signal and feeding said optical signal into a polarization-selective electro-optic modulator;
   (c) providing a dithering signal for said polarization-selective electro-optic modulator and outputting a dithered optical signal having a signal polarization by means of said polarization-selective electro-optic modulator;
   (d) splitting said dithered optical signal into first and second clusters;
   (e) applying said first cluster to a photodetector for measuring said optical signal-to-noise ratio; and
   (f) applying said second cluster to an optical element for said channel monitoring;
   wherein said polarization controller is sequentially adjusted to switch polarization state of said optical signal for generating a maximal or minimal value at the output of said polarization-selective electro-optic modulator to measure said optical signal-to-noise ratio.

* * * * *